(12) United States Patent
Tu

(10) Patent No.: US 11,836,631 B2
(45) Date of Patent: Dec. 5, 2023

(54) SMART DESK HAVING STATUS MONITORING FUNCTION, MONITORING SYSTEM SERVER, AND MONITORING METHOD

(71) Applicant: KUNSHAN MEIZHUO INTELLIGENT TECHNOLOGY CO., LTD., Kunshan (CN)

(72) Inventor: Liequn Tu, Kunshan (CN)

(73) Assignee: KUNSHAN MEIZHUO INTELLIGENT TECHNOLOGY CO., LTD., Kunshan (CN)

( * ) Notice: Subject to any disclaimer, the term of this patent is extended or adjusted under 35 U.S.C. 154(b) by 367 days.

(21) Appl. No.: 17/267,501

(22) PCT Filed: Aug. 9, 2019

(86) PCT No.: PCT/CN2019/099957
§ 371 (c)(1),
(2) Date: Feb. 10, 2021

(87) PCT Pub. No.: WO2020/034902
PCT Pub. Date: Feb. 20, 2020

(65) Prior Publication Data
US 2021/0326585 A1    Oct. 21, 2021

(30) Foreign Application Priority Data
Aug. 11, 2018   (CN) .......................... 201810911166.7

(51) Int. Cl.
*G06N 3/08* (2023.01)
*G06N 3/084* (2023.01)
(Continued)

(52) U.S. Cl.
CPC ........... *G06N 3/084* (2013.01); *G06F 18/214* (2023.01); *G06N 3/047* (2023.01); *G06V 10/764* (2022.01);
(Continued)

(58) Field of Classification Search
CPC ...... G06N 3/084; G06N 3/047; G06F 18/214; G06V 10/764; G06V 10/774; G06V 10/82;
(Continued)

(56) References Cited

U.S. PATENT DOCUMENTS

2017/0344806 A1   11/2017   Liu et al.

FOREIGN PATENT DOCUMENTS

CN   106125614 A       11/2016
CN   106851216 A   *   6/2017
(Continued)

OTHER PUBLICATIONS

First Office Action for CN201910734611 dated Dec. 17, 2020 (Year: 2020).*

(Continued)

*Primary Examiner* — Juan A Torres
(74) *Attorney, Agent, or Firm* — SOROKER AGMON NORDMAN PTE LTD

(57) ABSTRACT

Embodiments of the present disclosure include an intelligent desk having a state monitoring function, a monitoring system server, and a monitoring method. The intelligent desk comprises a desk body, an image acquisition device disposed on the desk body, and an AI recognition module, wherein the image acquisition device is used for acquiring a facial image of a user, and inputting the acquired facial image into the AI recognition module; the AI recognition module is used for recognizing whether a face in the input image is in a concentrating state; the intelligent desk further comprises a
(Continued)

communication module and/or a local prompting device, wherein the AI recognition module is capable of sending a recognition result of the concentrating state to a background server and/or a first client via the communication module, or the local prompting device can be triggered according to the recognition result of the concentrating state.

6 Claims, 3 Drawing Sheets

(51) Int. Cl.
| | |
|---|---|
| *G08B 7/06* | (2006.01) |
| *G06V 40/20* | (2022.01) |
| *G06V 20/40* | (2022.01) |
| *G06V 40/16* | (2022.01) |
| *G06V 40/18* | (2022.01) |
| *G06F 18/214* | (2023.01) |
| *G06N 3/047* | (2023.01) |
| *G06V 10/764* | (2022.01) |
| *G06V 10/774* | (2022.01) |
| *G06V 10/82* | (2022.01) |

(52) U.S. Cl.
CPC ............ *G06V 10/774* (2022.01); *G06V 10/82* (2022.01); *G06V 20/46* (2022.01); *G06V 40/165* (2022.01); *G06V 40/171* (2022.01); *G06V 40/172* (2022.01); *G06V 40/174* (2022.01); *G06V 40/18* (2022.01); *G06V 40/193* (2022.01); *G06V 40/20* (2022.01); *G08B 7/06* (2013.01)

(58) Field of Classification Search
CPC .... G06V 20/46; G06V 40/165; G06V 40/171; G06V 40/172; G06V 40/174; G06V 40/18; G06V 40/193; G06V 40/20; G08B 7/06; G08B 21/06; H04N 7/18; H04Q 9/00; H04Q 2209/20
USPC ......................................................... 382/103
See application file for complete search history.

(56) References Cited

FOREIGN PATENT DOCUMENTS

| | | | |
|---|---|---|---|
| CN | 107145864 A | * | 9/2017 |
| CN | 107766787 A | * | 3/2018 |
| CN | 107766787 A | | 3/2018 |
| CN | 107818310 A | * | 3/2018 |
| CN | 108041819 A | * | 5/2018 |
| CN | 108041819 A | | 5/2018 |
| CN | 108171176 A | * | 6/2018 |
| CN | 108304779 | | 7/2018 |

OTHER PUBLICATIONS

Second Office Action for CN201910734611 dated Apr. 29, 2021 (Year: 2021).*
International Preliminary Report on Patentability Chapter I of PCT/CN2019/099957 dated Feb. 16, 2021 (Year: 2021).*

* cited by examiner

SMART DESK HAVING STATUS MONITORING FUNCTION, MONITORING SYSTEM SERVER, AND MONITORING METHOD

CROSS-REFERENCE TO RELATED APPLICATIONS

This application claims the benefit of priority to Chinese Patent Application No. 201810911166.7 filed on Aug. 11, 2018.

TECHNICAL FIELD OF THE INVENTION

The present disclosure relates to intelligent desk field, in particular to an intelligent desk having a state monitoring function, a monitoring system server and a monitoring method.

BACKGROUND OF THE INVENTION

The current intelligent desks on the market focus on making improvements on intelligent adjustment of the desktop, intelligent dimming, etc., but the current intelligent desk cannot supervise a learning/working state of people studying or working on the desk. Therefore, in order to urge students to concentrate, parents are usually required to on-side supervise and remind them.

However, this kind of supervision not only consumes the energy of parents, but also makes students feel stressed and disgusted with this kind of on-side supervision while studying, which is not conducive to concentration.

There is a lack of a reasonable and effective learning/work state monitoring system and method in the prior art.

SUMMARY OF THE INVENTION

In order to solve the problems of the prior art, the present disclosure provides an intelligent desk with a state monitoring function, a monitoring system server and a monitoring method, and in view of the long-term observation and thinking of the above process, the designer actively researches and innovates in order to create a kind of space environment optimization device and system, which has more convenient and practical features and industrial value. The technical solution is as follows:

On the one hand, the present disclosure provides an intelligent desk having a state monitoring function, wherein the intelligent desk comprises a desk body, an image acquisition device disposed on the desk body, and an AI recognition module, wherein the image acquisition device is used for acquiring a human face image of a user, and inputting the acquired human face image into the AI recognition module, the AI recognition module is used for recognizing whether a human face in the input image is in an attention concentration state or not, and the AI recognition module is generated by a background server and updated regularly;

the intelligent desk further comprises a communication module and/or a local prompting device, wherein the AI recognition module is capable of sending a recognition result of an attention concentration state to the background server and/or a first client via the communication module, or, the local prompting device can be triggered according to the recognition result of an attention concentration state of the AI recognition module.

Further, the AI recognition module recognizing whether a human face in the input images is in an attention concentration state comprises:

utilizing a symmetry of two eyeballs, virtualizing a position of a center of each eyeball according to spherical curvature of each eyeball in the images;

combining it with positions of a center of each pupil in the images, virtualizing a gaze ray emitted from a center of each eyeball to a center of each pupil;

determining whether attention is concentrated according to convergence of two gaze rays of two eyes, and if the gaze rays have no focus, or the time that the focus of the gaze rays stays in a certain area exceeds a preset time range, a recognition result is determined as lack of concentration; if the focus of the gaze rays moves within a preset time range, a recognition result is determined as in an attention concentration state.

Further, the AI recognition module is a trained emotion recognition neural network model, wherein a training method of an emotion recognition neural network model is as follows:

acquiring training samples, wherein the training samples comprises a plurality of human face image samples and a pre-calibrated result corresponding to an attention concentration state;

defining a loss function, and minimizing the loss function:

performing self-learning on the emotion recognition neural network model according to the training samples and a minimized loss function, until an accuracy of the recognition result reaches a preset percentage threshold value, to obtain the trained emotion recognition neural network model.

Further, a method for minimizing a loss function comprises:

obtain a gradient of the loss function by adopting a back propagation method according to all weights and loss function of a neural network;

updating the weights of the neural network by adopting a stochastic gradient descent method according to the gradient; and performing iteration for a preset number of times on updated weights to complete a minimization operation on the loss function.

Further, the local prompting device comprises a control module and an execution module, wherein the control module is electrically connected to an output end of the AI recognition module, and the local prompting device can be triggered according to the recognition result of the attention concentration state of the AI recognition module, which comprises:

the control module receiving the recognition result of the attention concentration state output by the AI recognition module, and counting the numbers of recognized state result of concentration and state result of lack of concentration, and triggering the execution module to give out a prompt signal if a proportion of the state results of concentration is lower than the preset proportion threshold value, wherein the prompt signal comprises sound, light and/or vibration signals.

Optionally, the image acquisition device comprises one or more cameras.

Further, the intelligent desk further comprises a terminal having a downloaded second client, wherein the second client and the first client can perform message transmission through the background server:

the second client can receive a request for local prompt sent by the first client, and the terminal having a downloaded second client triggers the local prompting device to give out a prompt signal according to the request for local prompt, wherein the prompt signal comprises sound, light and/or vibration signals.

On the other hand, the present disclosure discloses a state monitoring system server, wherein the server receives an image wirelessly uploaded, the server comprises an AI recognition module and a processor, wherein the AI recognition module is used for recognizing whether a human face in received image is in an attention concentration state or in a state lack of concentration, the processor is used for counting recognition results of the AI recognition module, and the server sends the received image and/or a statistical result of the processor wirelessly to a corresponding first client.

Further, the server is further used for forwarding a message sent by the first client to a appointed second client wirelessly.

In another aspect, the present disclosure discloses a state monitoring method based on emotion recognition, comprising the following steps:

acquiring video information of a monitored object, and extracting one or more frame images from the video in a time sequence;

sequentially inputting the frame images into a pre-trained emotion recognition neural network model, wherein the emotion recognition neural network model is used for recognizing whether a human face in each frame image is in an attention concentration state or in a state lack of concentration;

receiving a recognition result corresponding to each frame image output by the emotion recognition neural network model;

calculating a proportion of recognized state results of concentration.

Further, after extracting one or more frame images from the video in a time sequence, the method further comprises:

extracting a face region in each frame image according to a face recognition algorithm, and generating an image corresponding to the face region.

Further, the method of training the emotion recognition neural network model is as follows:

acquiring training samples, wherein the training samples comprise a plurality of human face image samples and a pre-calibrated result corresponding to an attention concentration state;

defining a loss function and minimizing the loss function;

performing self-learning on the emotion recognition neural network model according to the training samples and a minimized loss function, until an accuracy of the recognition result reaches a preset percentage threshold value, to obtain the trained emotion recognition neural network model.

Further, after calculating a proportion of recognized state results of concentration, the method further comprises:

sending a statistical result to a first client of a monitoring party; or, if the proportion of the state results of concentration is lower than a preset proportion threshold value, sending a prompt message to a first client of a monitoring party, or sending a prompt message to a second client of a monitored party; or, receiving a message or request sent by a first client of a monitoring party, and forwarding the message or request to a second client of a monitored party.

The present disclosure also provides a method for monitoring working and learning state based on a face recognition technology, comprising connecting a face-oriented camera shooting system to a processing unit for video and image processing, and to a storage for data management, wherein the monitoring method comprises the following steps: S1: acquiring a human facial-feature images or videos through a camera; S2: extracting a face region in a video or an image according to a face recognition algorithm, and extracting feature points/quantities in the face region; S3: determining whether a working and learning personnel are distracted, and are not in a state of study or work, that is, whether the attention is distracted according to the features of the extracted face region;

the system further comprises a network system, which is connected to the processing unit and the storage, and transfers or directly stores the camera system data in the cloud of the network system;

in Step S2, extracting a face region in a video image in the working and learning state comprises the following steps: S2.1: carrying out image sampling the on collected face video in the working and learning state, the sampling value is 2 or several frames of images comparing feature quantities or feature points, or customized by the user, comparing within a time range of N seconds or N frames; or if multiple cameras are involved, comparing the feature sets collected by different cameras;

after S2.1, S2.2: according to a principle of face recognition, performing feature extraction on the human face in the images, and collecting the feature sets into a database; S2.3: if multiple cameras are involved, comparing the feature sets collected by different cameras, and confirming the number of repetitions of persons according to a set threshold value, and eliminating duplicate, so as to avoid repetitive statistics of persons;

the method further comprises: establishing a human face image library of people in a monitored work and learning state, and recognizing concentration degree data of each person through face comparison, thereby determining the concentration behavior of a specific person, and analyzing parameters and features thereof;

the processor is further connected to a camera for shooting an area where the learning or work content is located;

the method further comprises: importing state monitoring process data to form a process concentration distribution analysis of a monitored person, which specifically comprises: 1, issuing multi-level alarm signals to an upper-level administrator, especially a senior administrator of network end, in accordance with a set threshold value in the network segment; 2, performing data association by taking a time value as a dimension; 3. forming process concentration distribution results in the monitoring scene/area by taking time as an axis, to complete the monitoring of the work and learning state of the monitored person.

The beneficial effects brought by the technical solution provided by the present disclosure are as follows:

a. The intelligent desk is equipped with a local AI recognition module to monitor the learning state of learners under off-grid conditions, which supervises and improves learning efficiency;

b. The communication module of the intelligent desk is connected to the cloud server to realize cloud monitoring and remote monitoring.

BRIEF DESCRIPTION OF THE DRAWINGS

For more clearly explaining the technical solutions in the embodiments of the present disclosure, the accompanying drawings used to describe the embodiments are simply introduced in the following. Apparently, the below described drawings merely show a part of the embodiments of the present disclosure, and those skilled in the art can obtain other drawings according to the accompanying drawings without creative work.

DETAILED DESCRIPTION OF EXEMPLARY EMBODIMENTS

In order to enable those skilled in the art to better understand the solution of the present disclosure, in the following, the technical solutions in the embodiments of the present disclosure are explained clearly and fully combining with the accompanying drawings, and apparently, the described embodiments are merely a part of the embodiments of the present disclosure, not all the embodiments. Based on the embodiments of the present disclosure, all other embodiments obtained by one of ordinary skill in the art without creative work fall within the protective scope of the present disclosure.

It should be noted that terms "first", "second" and the like in the description, the claims and the accompanying drawings of the present disclosure are used to distinguish similar objects, and do not have to be used to describe a specific order or sequence. It should be understood that the data so used can be interchanged under appropriate circumstances so that the embodiments of the present disclosure described herein can be implemented in an order other than those illustrated or described herein. In addition, the terms "comprise" and "have" and any variations thereof are intended to cover non-exclusive inclusions, for example, processes, methods, devices, products or equipment that comprise a series of steps or units are not necessarily limited to those clearly listed steps or units, but may comprise other steps or units not explicitly listed or inherent to these processes, methods, products or equipment.

Figure 1:
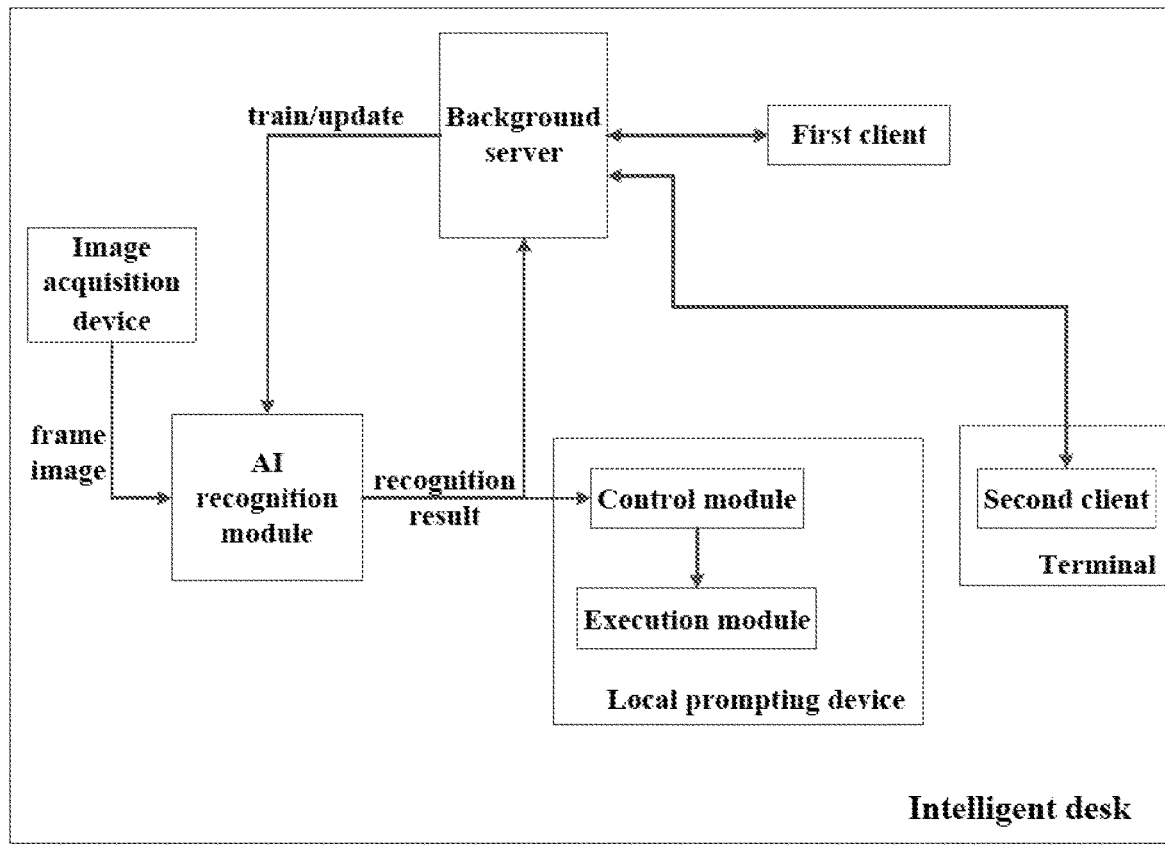
FIG. 1 is a block diagram of modules of an intelligent desk having a state monitoring function provided by an embodiment of the present disclosure.

In one embodiment of the present disclosure, an intelligent desk having a state monitoring function is provided, as shown in FIG. 1, the intelligent desk comprises a desk body, an image acquisition device disposed on the desk body, and an AI recognition module, wherein the image acquisition device is used for acquiring a human face image of a user, and inputting the acquired human face image into the AI recognition module, and the AI recognition module is used for recognizing whether a human face in the input image is in an attention concentration state or not, and the AI recognition module is generated by a background server and updated regularly.

When the AI recognition module completes the training, even if the network is disconnected, the intelligent desk can also realize the state monitoring function: the intelligent desk is provided with a local prompting device, the local prompting device comprises a control module and an execution module, the control module is electrically connected to an output terminal of the AI recognition module, and the control module receives the recognition result of the attention concentration state output by the AI recognition module, and counts the numbers of recognized state results of concentration and the state results of lack of concentration, and triggers the execution module to give out a prompt signal if the proportion of the state results of concentration is lower than the preset proportion threshold value, wherein the prompt signal comprises sound, light and/or vibration signals. Preferably, the image acquisition device collects the user's face images at equal time intervals, so that the ratio of the number of images can be in comparison with the ratio of time, for example, within 40 minutes, the image acquisition device collects 4800 frame images, or video streams obtained by shooting can extract 4800 frames of images at equal intervals in time sequence, and each frame of image is input to the AI recognition module for recognition, the recognition result of the AI recognition module is either 1 (indicating concentration), or 0 (indicating lack of concentration), the control module counts in the 4800 frames of images, the number of frame images recognized as 1 is N, then its proportion is N/4800, which is equivalent to the ratio of time of concentration to total time (40 minutes). According to expert analysis, it is basically impossible to maintain concentration for the entire 40 minutes. According to the expert's advice, the results of the concentration evaluation can be formulated, for example, if the concentration time in 40 minutes is less than 25 minutes, it is evaluated as unqualified concentration, and if the time of concentration is more than or equal to 32 minutes, it is evaluated as excellent concentration, etc. According to the above standard, if the number of frame images whose recognition results are 1 counted by the control module is less than 3000 (i.e. 4800*25/40) frames, the control module triggers the execution module to give out a prompt signal, and the execution module may instruct lights, speakers, or vibration motors, etc., can also combine multiple kinds of prompts.

In addition to monitoring and prompting in off-grid state, in one embodiment of the present disclosure, online monitoring and prompting can be implemented, and in online state, the background server can update and optimize the model of the AI recognition module to continuously improve an accuracy of recognition performance of the model. The online monitoring process is as follows: the AI recognition module can communicate with the background server through the communication module, and connect with the mobile client of the corresponding monitoring party (such as a parent) through the background server, and finally send the AI recognition result or video images to the parent's mobile phone, or send obtained analysis results (such as an attention concentration curve and the concentration evaluation results, such as the process concentration distribution curve in the monitoring area formed on the time axis) by analyzing and processing the AI recognition results via the background server to the parent's mobile phone, or send a reminder message to the second client on side of the intelligent desk to remind the monitored party to concentrate. Hereinafter, the mobile phone client of the monitoring party such as the parents is called the first client, and the client integrated on the intelligent desk or the student's own mobile phone (or other terminal such as a tablet) is called the second client. It should be noted that the intelligent desk of the present disclosure is not specifically limited to a desk, a work table, or other types of desks.

The following describes the specific solutions for the AI recognition module to recognize whether a face in an input image is in an attention concentration state:

The first solution is: the AI recognition module recognizing whether a face in the input image is in an attention concentration state comprises: utilizing a symmetry of two eyeballs, virtualizing a position of a center of each eyeball according to spherical curvature of each eyeball in the images; and combining it with positions of a center of each pupil in the images, virtualizing an gaze ray emitted from a center of each eyeball to a center of each pupil; determining whether attention is concentrated according to convergence of two gaze rays of two eyes, and if the gaze rays have no focus, or the time that the focus of the gaze rays stays in a certain area exceeds a preset time range, a recognition result is determined as lack of concentration; if the focus of the gaze rays moves within a preset time range, a recognition result is determined as in an attention concentration state. Wherein, for the case that the gaze rays have no focus, it can be determined from a single frame of image, while for the case where the gaze rays have a focus, it can be determined whether the attention is concentrated on the basis of multiple frames of images before and after.

The second solution is: the AI recognition module is a trained emotion recognition neural network model, the AI recognition module is trained by the background server, wherein a training method of an emotion recognition neural network model is as follows:

First, acquiring training samples, wherein the training samples comprises a plurality of human face image samples and a pre-calibrated result corresponding to an attention concentration state. Specifically, calibration of each training sample is performed by a professional psychologist or educator, that is, for a certain frame of image, the calibration of 1 indicates that the face in the frames of images reflect the attention concentration state, and the calibration of 0 indicates that the face in the frames of the images reflect the state of lack of concentration. The calibrated training samples are input to the neural network model for training and learning, and the more training samples and the more accurate the calibration, the higher the recognition accuracy of the emotion recognition neural network model after the final training is completed.

Second, defining a loss function and minimizing the loss function; Specifically, according to all weights and loss function of a neural network, using the back propagation method to obtain the gradient of the loss function; according to the gradient, updating the weights of the neural network using the stochastic gradient descent method; performing iterations for a preset number of times on updated weights to complete a minimization operation on the loss function.

Again, performing self-learning on the emotion recognition neural network model according to the training samples and the minimized loss function, until an accuracy of the recognition result reaches a preset percentage threshold value, to obtain the trained emotion recognition neural network model. Wherein, the percentage threshold value is artificially set, and the higher the set value, the longer the training time and the greater the training difficulty, and the greater the recognition accuracy of the trained model.

In an embodiment of the present disclosure, the image acquisition device comprises one or more cameras, the desk has a liftable structure, and the camera rises as the desk top of the desk body rises or is lowered as the desk top of the desk body is lowered. That is, the height between the camera and the desktop of the desk body remains unchanged, so that regardless of the height of the user of the intelligent desk, when the desktop is adjusted to a suitable height, the camera can capture the face image of the user. As for multiple cameras, the shooting directions are all concentrated towards the same user, and compared with a single camera, setting up multiple cameras can capture face images from multiple angles, wherein, it is preferable to use the face image taken from the front as the main basis of determination, and the image taken from the side is the auxiliary basis of determination, and on the premise that the front image can determine the attention concentration state with high accuracy, the side shot images can be omitted from analysis, only when the front image cannot be determined with great certainty to determine the correct state, the auxiliary analysis of the side shot images is needed to improve the accuracy of the recognition result of the emotion recognition neural network model. The camera is preferably a wide-angle lens, and the fixed position of the camera is variable.

In a preferred embodiment of the present disclosure, the intelligent desk also comprises a terminal having a downloaded second client (the terminal can be a student's intelligent terminal or an intelligent terminal integrated on the intelligent desk), on the premise that the terminal is connected to the network, the second client and the first client can perform message transmission through a background server, for example, the second client can perform voice and/or video communication with the first client, the voice and/or video communication may be initiated by the first client to the second client, or may be initiated by the second client to the first client. Or, the second client can receive a request for local prompt sent by the first client, and the terminal with the second client downloaded triggers the local prompting device to give out a prompt signal according to the request for local prompt request, and the prompt signal comprises sound, light and/or vibration signals, for example, when the parent inquires through the first client that the user studying at the intelligent desk is lack of concentration, the parent clicks the reminder button on the first client, and the background server receives the reminder action of the first client, and then sends a prompt signal to the second client corresponding to the first client, such as making the second client receive a message ringtone or controlling the terminal where the second client is downloaded to play a prompt animation or put it in a vibration mode.

Figure 2:
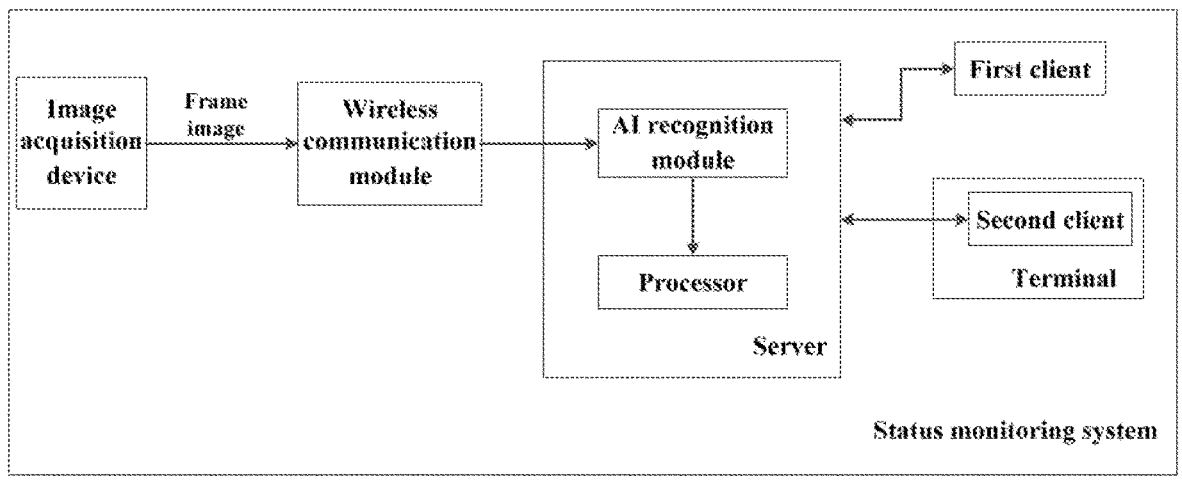
FIG. 2 is a block diagram of basic modules of a state monitoring system provided by an embodiment of the present disclosure.
Figure 3:
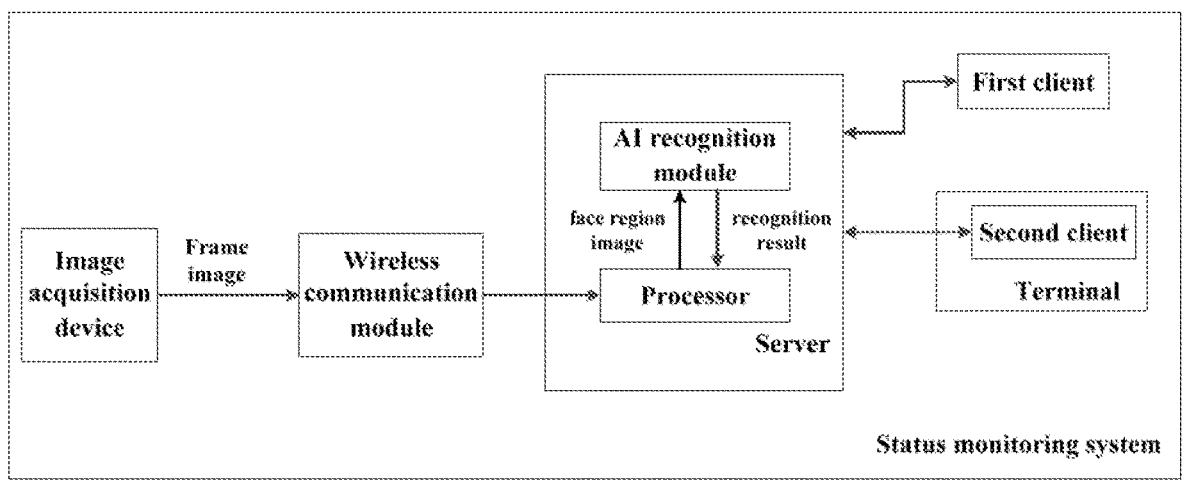
FIG. 3 is a block diagram of a state monitoring system having a face feature extraction function provided by an embodiment of the present disclosure.

In one embodiment of the present disclosure, a state monitoring system server is provided, as shown in FIG. 2, the server receives images uploaded through wireless communication, differing from the above-mentioned embodiment in which the AI recognition module is set locally, the AI recognition module in this embodiment is set on the server or the cloud, and the server comprises an AI recognition module and a processor, the AI recognition module is used for recognizing a human face in the received images is in an attention concentration state or in a state lack of concentration, the processor is used to count recognition results of the AI recognition module, and the server sends the received images and/or the statistical result of the processor through wireless communication to a corresponding first client. In a preferred embodiment of the present disclosure, the state monitoring system is shown in FIG. 3, wherein the processor is further to extract the face regions in the frame images according to the face recognition algorithm, and generate the corresponding face region images, so that the interference of the original images is reduced and the recognition accuracy of the final AI recognition module is improved due to that the images of the face regions are extracted, the images outside the face regions are discarded. In addition, when the AI recognition module is set on the server side, since the server corresponds to the image acquisition devices of multiple intelligent desks, the server can receive image resources uploaded by multiple intelligent desks, so that the AI recognition module on the server side can (compared to the case of being set on the intelligent desk locally), it has a wider range of learning material resources to better adaptive learning, and improve model precision and recognition accuracy.

The state monitoring system server in the embodiment of the present disclosure is also used to forward the message sent by the first client to a designated second client through wireless communication, the message comprises, for example, an audio/video call request, such as the signal reminding to concentrate, or the trigger signal that triggers the local prompting device on the intelligent desk, and an implementable technical solution is specifically as follows: when a parent sends an intelligent reminder signal on the first client, the server can send this reminder signal to the second client, and on the premise that the terminal where the second client is downloaded is connected to the input terminal of the control module in the local prompting device on the intelligent desk, the control module can control the execution module in the local prompting device to give out a local prompt signal according to the intelligent reminder signal of the first client, for example, the execution module is a vibration motor embedded in the desktop to realize the vibration for a preset time, that is, the parents remotely monitor, and when it is found that the monitored object is lack of concentration, pressing the button of the mobile phone client, the desktop of the intelligent desk can be triggered to vibrate to remind the monitored object to concentrate, which is very effective for users lack of concentration to concentrate immediately.

Figure 4:
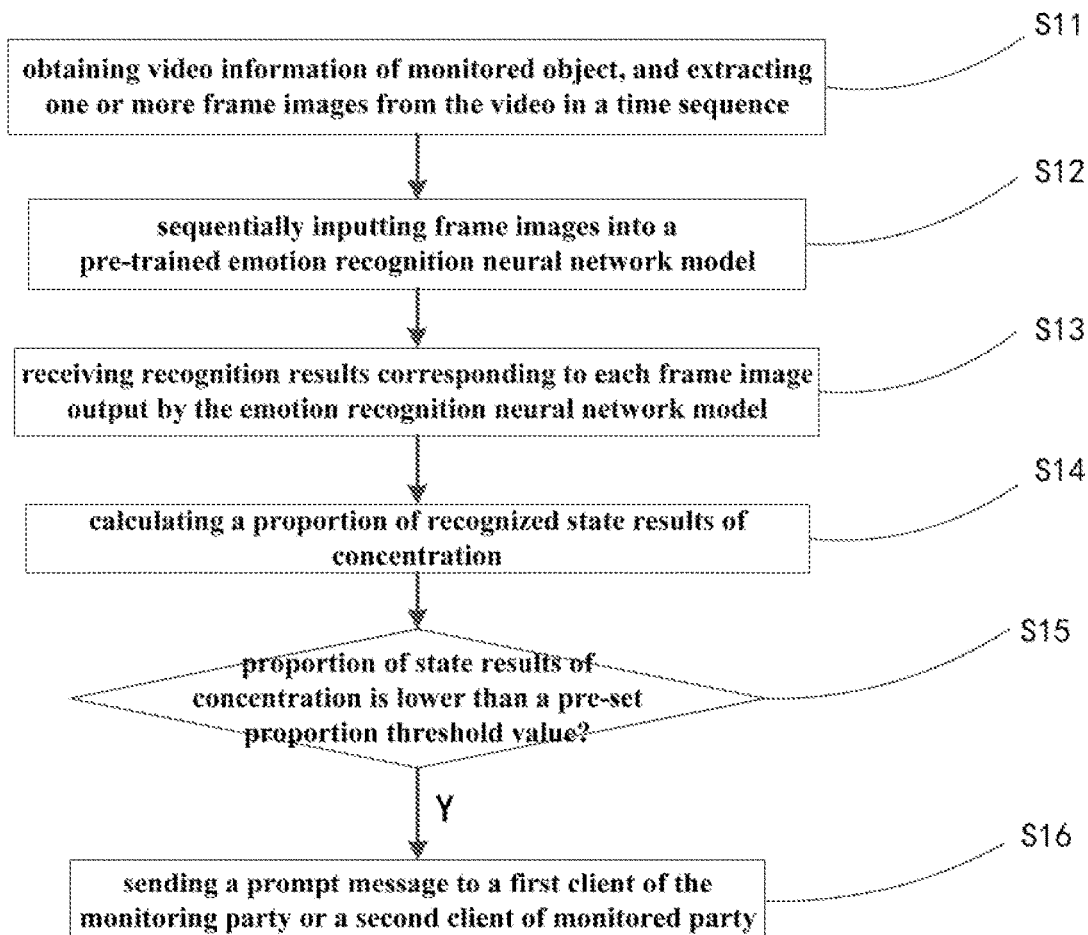
FIG. 4 is a flow chart of a state monitoring method based on emotion recognition provided by an embodiment of the present disclosure.

In one embodiment of the present disclosure, a state monitoring method based on emotion recognition is provided, referring to FIG. 4, the monitoring method comprises the following steps:

S11, acquiring video information of a monitored object, and extracting one or more frame images from the video in a time sequence. Specifically, the video information is captured by an image acquisition device (camera device) on the intelligent desk, which can capture images comprising a face region of the monitored object.

S12, sequentially inputting the frame images into a pre-trained emotion recognition neural network model, wherein the emotion recognition neural network model is used for recognizing whether a human face in each frame image is in an attention concentration state or in a state lack of concentration.

S13, receiving a recognition result corresponding to each frame image output by the emotion recognition neural network model.

S14, calculating a proportion of recognized state results of concentration.

After S14, one method is to actively send the statistical results to the first client of the monitoring party; the other is to wait for the first client to send an inquiry request before sending the statistical results to the first client of the monitoring party.

After S14, S15 can be performed: determining whether the proportion of the state results of concentration is lower than a preset proportion threshold value, and if yes, performing S16: sending a prompt message to a first client of a monitoring party, or sending a prompt message to a second client of a monitored party, as shown in FIG. 4.

In one preferred embodiment of the present disclosure, the state monitoring method further comprises: receiving a message or request sent by the first client of the monitoring party; forwarding the message or request to the second client of the monitored party, the message or request comprises, for example, an audio/video call request, a signal reminding to concentrate, or a trigger signal that triggers the local prompting device on the intelligent desk.

A method of training the emotion recognition neural network model in S12 is as follows:

acquiring training samples, wherein the training samples comprise a plurality of human face image samples and a pre-calibrated result corresponding to an attention concentration state;

defining a loss function and minimizing the loss function;

performing self-learning on the emotion recognition neural network model according to the training samples and a minimized loss function, until an accuracy of the recognition result reaches a preset percentage threshold value, to obtain the trained emotion recognition neural network model.

For details, please refer to the above-mentioned intelligent desk embodiments, which will not be repeated here.

Figure 5:
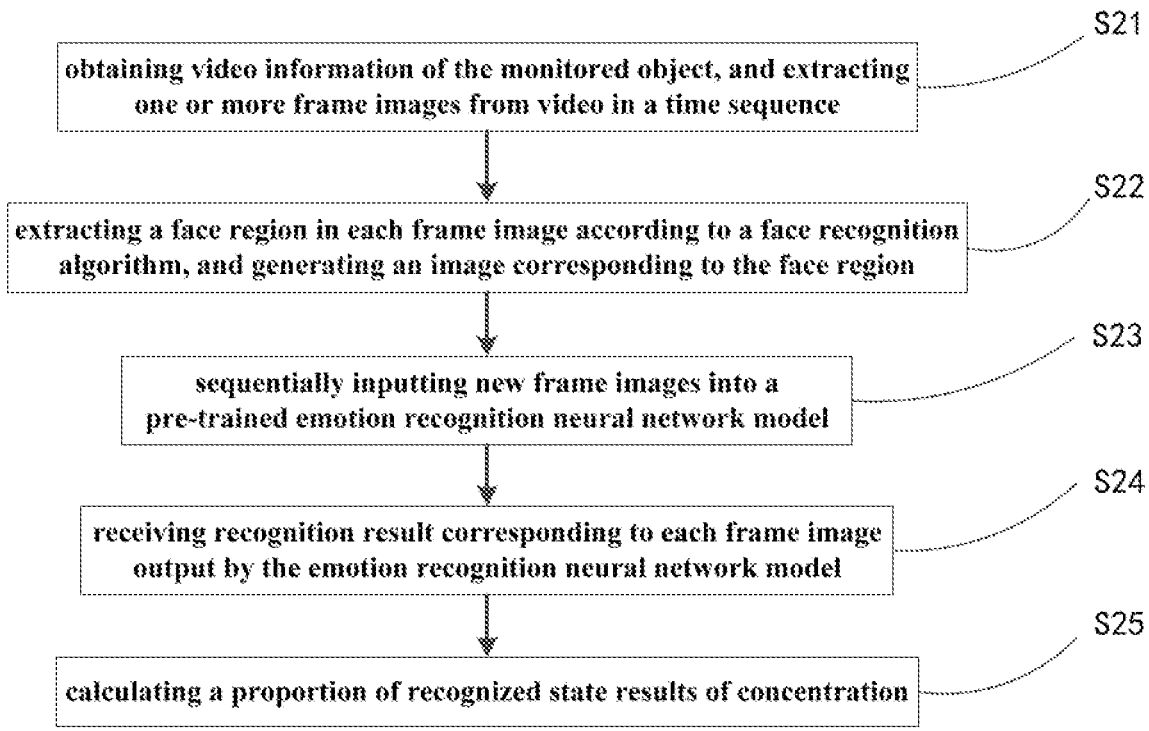
FIG. 5 is a flow chart of a face feature extraction step in the state monitoring method provided by an embodiment of the present disclosure.

In one more preferred embodiment of the present disclosure, a state monitoring method based on emotion recognition is as shown in FIG. 5, and comprises the following steps:

S21, acquiring video information of a monitored object, and extracting one or more frame images from the video in a time sequence. Specifically, the video information is captured by an image acquisition device (camera device) on the intelligent desk, which can capture images comprising a face region of the monitored object.

S22, extracting a face region in each frame image according to a face recognition algorithm, and generating an image corresponding to the face region.

S23, sequentially inputting the frame images into a pre-trained emotion recognition neural network model, wherein the emotion recognition neural network model is used for recognizing whether a human face in each frame image is in an attention concentration state or in a state lack of concentration.

S24, receiving a recognition result corresponding to each frame image output by the emotion recognition neural network model.

S25, calculating a proportion of recognized state results of concentration.

Figure 6:
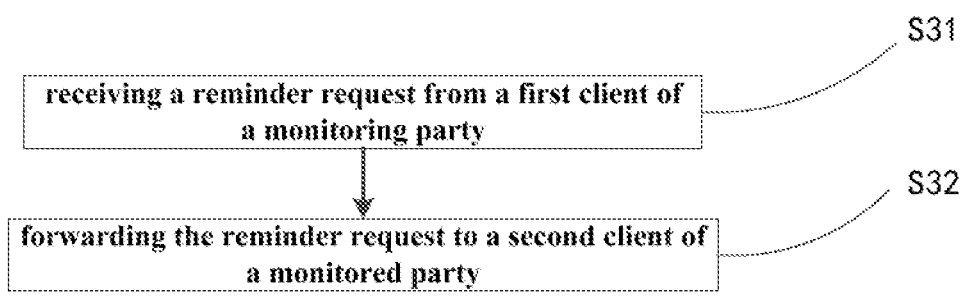
FIG. 6 is a flow chart of a method for a first client to perform prompt and control in the state monitoring method provided by an embodiment of the present disclosure.

The state monitoring method based on emotion recognition may comprise the following steps, as shown in FIG. 6:

S31, receiving a reminder request from a first client of a monitoring party;

S32, forwarding the reminder request to the second client of the monitored party.

After the second client receives the reminder request, one way is to give out a reminder message on the second client or the terminal where it is located to remind the monitored party to concentrate, and the other way is through the terminal where the second client is downloaded, to send the reminder request to the control module of the local prompting device, and the control module controls the execution module of the local prompting device to perform sound, light and/or vibration alarm operations.

The disclosure discloses a work and learning state monitoring system based on face recognition technology, in particular to a work and learning state monitoring system based on face recognition technology for supervising students and improving learning efficiency and staff efficiency. In the existing technical solutions, the analysis of the learning people is directly recorded by the way of on looking of the supervising people, focusing on the artificial method of the subjective impression of the listeners; this technology uses a relatively new technology to perform face recognition to analyze and determine. Thereby changing the way of relying on a lot of human participation and lacking practical application effect. However, in the current market, this method lacks scientificity in the calculation and analysis after data collection; in practical application, it lacks the correlation analysis of data application and lacks systematicness. In view of the long-term observation and thinking of the above process, the designer actively researches and innovates in order to create a kind of space environment optimization device and system, which has more convenient and practical features and industrial value.

The primary purpose of the present disclosure is to provide a work and learning state monitoring system based on face recognition technology, which provides objective and true data results for teaching academic analysis or work efficiency monitoring through scientific big data algorithms. A further object of the present disclosure is to provide a work and learning state monitoring system based on face recognition technology. This system can provide an efficient learning environment and an efficient working environment, and calculate the best learning time and working state time period of the monitored person. To solve the above technical problem, the technical solution provided by the present disclosure is as follows: in one embodiment of the present disclosure, a method for monitoring work and learning state based on face recognition technology is provided, which comprises connecting a face-oriented camera shooting system to a processing unit for video and image processing, and to a storage for data management, wherein the monitoring method comprises the following steps, S1: acquiring a human facial-feature images or videos through a camera; S2: extracting a face region in a video or an image according to a face recognition algorithm, and extracting feature points/quantities in the face region; S3: determining whether a working and learning personnel are distracted, and are not in a state of study or work, that is, whether the attention is distracted according to the features of the extracted face region:

Preferably, the system also comprises a network system, which is connected to the processing unit and the storage, and transfers or directly stores the camera system data in the cloud of the network system;

Preferably, in Step S2, extracting a face region in a video images in the working and learning state comprises the following steps: S2.1: carrying out image sampling the on collected face video in the working and learning state, the sampling value is 2 or several frames of images comparing feature quantities or feature points, or customized by the user, comparing within a time range of N seconds or N frames; or if multiple cameras are involved, comparing the feature sets collected by different cameras;

Preferably, after S2.1, S2.2: according to a principle of face recognition, performing feature extraction on the human face in the images, and collecting the feature sets into a database; S2.3: if multiple cameras are involved, comparing the feature sets collected by different cameras, and confirming the number of repetitions of persons according to a set threshold value, and eliminating duplicate, so as to avoid repetitive statistics of persons;

Preferably, the method also comprises: establishing a human face image library of people in a monitored work and learning state, and recognizing concentration degree data of each person through face comparison, thereby determining the concentration behavior of a specific person, and analyzing parameters and features thereof;

Preferably, the processor is also connected to a camera for shooting an area where the learning or work content is located; for example, a computer screen of a work tool, a book on a desk while studying, etc., generally the camera is set in front of the face of the monitored object, and its set position is preferably adjustable.

Preferably, the method also comprises: importing state monitoring process data to form a process concentration distribution analysis of a monitored person, which specifically comprises: 1, issuing multi-level alarm signals to an upper-level administrator, especially a senior administrator of network end, in accordance with a set threshold value in the network segment; 2, performing data association by taking a time value as a dimension; 3. forming process concentration distribution results in the monitoring scene/area by taking time as an axis, to complete the monitoring of the work and learning state of the monitored person.

The intelligent desk of the present disclosure is based on the AI recognition technology to monitor the concentration during study/work, and makes a prompt action when lack of concentration is monitored, so as to supervise the concentration and improve the learning/work efficiency.

The above are only preferred embodiments of the present disclosure, and are not intended to limit the present disclosure. Any modifications, equivalent substitutions, improvements, etc. made within the spirit and principle of the present disclosure shall be included in the protective scope of the present disclosure.

What is claimed is:

1. An intelligent desk haying a state monitoring function, wherein the intelligent desk comprises a desk body, an image acquisition device disposed on the desk body, and an AI recognition module, wherein the image acquisition device used for acquiring a human face image of a user, and inputting the acquired human face image into the AI recognition module, the AI recognition module is used for recognizing whether a human face in the input image is in an attention concentration state or not, which comprises utilizing a symmetry of two eyeballs, virtualizing, a position of a center of each eyeball according to spherical curvature of each eyeball in the images; combining it with positions of a center of each pupil in the images, virtualizing an gaze ray emitted from a center of each eyeball to a center of each pupil; determining whether attention is concentrated according to convergence of two gaze rays of two eyes, and if the gaze rays have no focus, or the time that the focus of the gaze rays stays in a certain area exceeds a preset time range. an recognition result is determined as lack of concentration; if the focus of the gaze rays moves within a preset time range, an recognition result is determined as in an attention concentration state: and the AI recognition module is generated by a background server and updated regularly;

the intelligent desk further comprises a communication module and a local prompting device, wherein the AI recognition module is capable of sending a recognition result of an attention concentration state to the background server and a first client of a monitoring party via the communication module, the local prompting device can be triggered according to the recognition result of an attention concentration state of the AI recognition module, the local prompting device is used to remind a monitored party using the intelligent desk, wherein the local prompting device comprises a control module and an execution module, wherein the control module is electrically connected to an output end of the AI recognition module; the execution module is a vibration motor to trigger a vibration of the intelligent desk; the control module is configured to receive the recognition result of the attention concentration state output by the AI recognition module, and to count the numbers of recognized state result of concentration and state result of lack of concentration, and to trigger the execution module to send out a vibration signal if a proportion of the state results of concentration is lower than a preset proportion threshold value;

the local prompting device is also used for communication connection with a second client of the monitored party, the first client of the monitoring party can receive images of the monitored party, and can send a local prompting request to the second client; in response to the local prompting request the second client triggers the local prompt device to send a vibration signal, or the second client itself sends a prompt signal, wherein the prompt signal sent by itself includes one or more of the second client receiving a message ring tone, a terminal of the second client playing a prompt interface, and a terminal of the second client producing a vibration.

2. The intelligent desk according to claim 1, wherein the preset proportion threshold value is configurable.

3. The intelligent desk according to claim 1, wherein the image acquisition device comprises a plurality of cameras, and shooting directions of the plurality of cameras are concentrated towards the same monitored party from the front and the side respectively, and the human face image taken from the front is a main judgment basis, and the human image taken from the side is an auxiliary judgment basis.

4. The intelligent desk according to claim 1, wherein the AI recognition module is set at the local end, on the server side or in the cloud:

if the AI recognition module is set at the local end, the intelligent desk can realize the status monitoring function even if the network is disconnected;

if the AI recognition module is set on the server side, the server integrates image resources transmitted from multiple smart desktops to provide learning material resources for the AI recognition module for adaptive learning.

5. The intelligent desk according to claim 1, wherein the intelligent desk is also used to import status monitoring process data to form a process concentration distribution analysis of a monitored party, comprising: issuing a multi-level alarm signals to an upper-level administrator or a senior administrator of the network end according to a set threshold value in the network segment; performing data association by taking a time value as a dimension; forming process concentration distribution results in the monitoring scene/area by taking time as an axis.

6. A state monitoring system server, wherein the server receives an image wirelessly uploaded, the server comprises an AI recognition module and a processor, wherein the AI recognition module is used far recognizing whether a human face in received image is in an attention concentration state or in a state lack of concentration, which comprises utilizing a symmetry of two eyeballs, virtualizing a position of a center of each eyeball according to spherical curvature of each eyeball in the images; combining it with positions of a center of each pupil in the images, virtualizing an gaze ray emitted from a center of each eyeball to a center of each pupil; determining whether attention is concentrated according to convergence of two gaze rays of two eyes, and if the gaze rays have no focus. or the time that the focus of the gaze rays. stays in a certain area exceeds a preset time range, an recognition result of attention concentration state is determined as lack of concentration; if the focus of the gaze rays moves within a preset time range, an recognition result of attention concentration state is determined as in an attention concentration state; the processor is used for counting recognition results of the AI recognition module, and the server sends the received image and/or a statistical result of the processor wirelessly to a corresponding first client of a monitoring party;

the processor is configured to receive the recognition result of attention concentration state output by the AI recognition module, and to count the numbers of recognized state result of concentration and state result of lack of concentration, and to trigger an execution module to send out a vibration signal if a proportion of the state results of concentration is lower than a preset proportion threshold value.

\* \* \* \* \*